No. 764,317. PATENTED JULY 5, 1904.
P. TODD.
CAR FENDER.
APPLICATION FILED APR. 12, 1904.
NO MODEL.

Witnesses:
K. H. Baker
E. E. Potter

Inventor
P. Todd,
By H. C. Evert & Co.
Attorneys

No. 764,317. Patented July 5, 1904.

UNITED STATES PATENT OFFICE.

PHILIP TODD, OF HOMESTEAD, PENNSYLVANIA.

CAR-FENDER.

SPECIFICATION forming part of Letters Patent No. 764,317, dated July 5, 1904.

Application filed April 12, 1904. Serial No. 202,740. (No model.)

*To all whom it may concern:*

Be it known that I, PHILIP TODD, a citizen of the United States of America, residing at Homestead, in the county of Allegheny and State of Pennsylvania, have invented certain new and useful Improvements in Car-Fenders, of which the following is a specification, reference being had therein to the accompanying drawings.

This invention has relation to car-fenders, and has for its object the provision of a fender of novel construction so arranged that it may be depressed from its normal position, which is on a horizontal line somewhat above the rails, to a position at an acute angle to the rails and with its front edge in immediate proximity thereto.

In carrying my invention into effect I provide a substantially rectangular frame which incloses a suitable network, and I pivotally attach this frame to a portion of the running-gear of the car, and I connect the frame to a spring-pressed lever that is pivoted to the bottom of the car and that is moved by a pin projecting through a hole in the platform of the car in such position that it may be depressed by the foot of the driver. By this means I provide for the movement of the fender to lower it and bring it close to the rails, which means is operable by the motorman without removing his hands from the brake-handles and controller, it being only necessary for the motorman when the fender is to be depressed to place his foot on the pin which, as before stated, projects through the platform of the car.

My invention consists in the novel construction, combination, and arrangement of parts hereinafter described and claimed.

Figure 1:
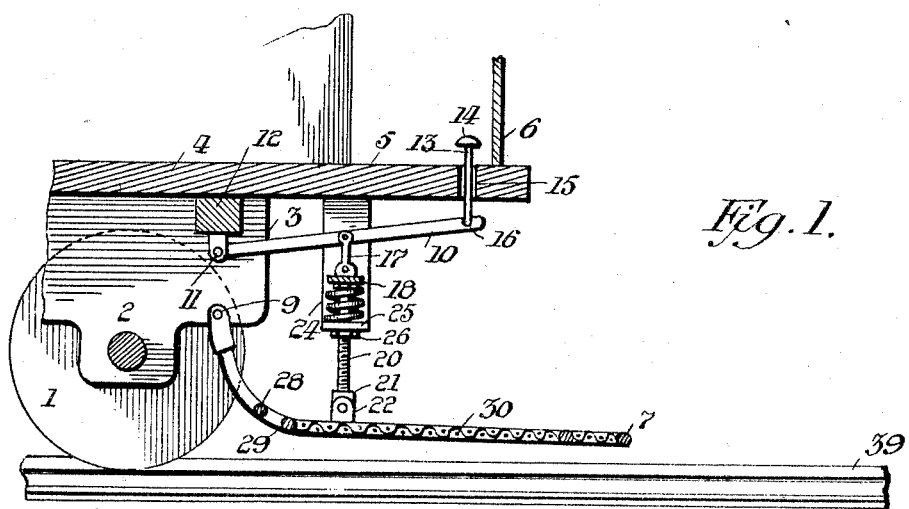
Figure 2:
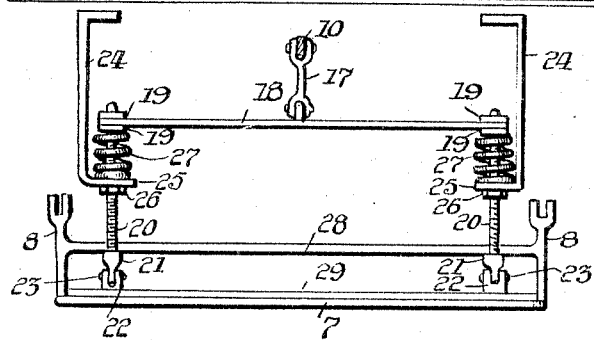
Figure 3:
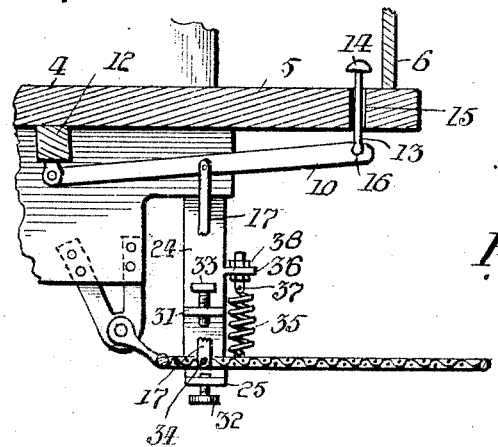

In the accompanying drawings, Figure 1 is a vertical sectional view through the end and platform of a car having my improvement applied thereto. Fig. 2 is a front elevation of the fender, and Fig. 3 is a vertical sectional view of the front end and platform of a car, showing a modified form of my improvement applied thereto.

The car is mounted on wheels 1, which are journaled in bearings 2, carried by the bar 3 of the truck. The bottom 4 of the car is mounted on the truck 3, and said bottom is projected to form the platform 5, which latter is provided with the usual dashboard 6, these parts, so far described, being of the usual or any desired construction.

The fender is composed of the frame 7, which is of rectangular or any other suitable configuration, and the side bars of said frame are curved upwardly, as indicated at 8, and pivotally secured at 9 to the truck 3.

A lever 10 is fulcrumed at 11 to a cross-beam 12 on the bottom of the car, and a pin 13, which has a head 14, projects through a hole 15 in the platform 5 and bears on the outer end of the lever 10, the lower end of said pin resting in a notch 16 formed in the said lever. The lever 10 is connected by a ring 17 to a cross-bar 18, and the said cross-bar has secured to each of its ends, by means of nuts 19 19, downwardly-depending bolts 20 20, which have pierced heads 21 21, that are secured to clips 22 22, carried by the frame 7, by bolts 23 23. Hangers 24 24 are attached to the bottom of the car and have inwardly-turned lower ends 25 25, which are pierced for the passage of the bolts 20 20, and nuts 26 26 are screwed upon the bolts 20 20, and when the parts are in their normal position these nuts bear against the inwardly-turned ends of the hangers 24 24 and serve to limit the upward movement of the bolts. Spiral springs 27 27 are interposed between the inwardly-turned ends 25 of the hangers 24 and the nuts 10, and these springs serve to impel the cross-bar 18 upwardly. The frame 7 is suitably braced by cross-rods 28 29, and a netting 30 is secured within the frame, extending from the front edge thereof to the cross-rod 29, and said netting being composed of interwoven wires or other suitable material. In the modified form shown in Fig. 3, in which those parts corresponding to the parts shown in Fig. 1 are designated by like numerals, the hangers 24, in addition to the inwardly-turned ends 25, are formed with ears 31, and a set-screw 32 passes through the inwardly-turned end 25, while a similar screw 33 passes through the ear 31, these screws being in vertical alinement with the sides of the frame 7 and serving to limit the vertical movement of the frame in an upward and downward direction. In this form of my improvement the link 17 is connected to a cross-bar 34 of the frame 7, and springs 35 are connected to ears 36 on the front edges of the hangers 24 by means of a bolt 37 and nuts 38. Under normal conditions the fender is sustained by the spiral springs in a position substantially parallel with the roadway or with the railway-track 39, as shown in Fig. 1 of the drawings, this position of parts allowing the fender to pass over any small inanimate object that may lie upon the roadway between the tracks. When the motorman finds that he is in such proximity to a person crossing the tracks that there is danger of striking such person, he puts his foot on the head 14 of the pin 13 and bears down forcibly upon the same, and thereby depresses the outer end of the lever 10. The depression of the lever 10 forces the bar 18 and the bolts 20 downwardly and, overcoming the resiliency of the springs 27 27, causes the front edge of the frame 7 to be depressed into immediate proximity or, if desired, into actual contact with the surface of the tracks, thereby substantially preventing the person when struck by the fender from passing under the same.

Having described my invention, I claim—

1. The combination with a car, of a fender pivotally secured at one end of said car, bolts secured to the fender in front of the pivotal point, a cross-bar secured to said bolts, springs arranged to sustain the fender in elevated position, a lever connected to said cross-bar, and a pin projecting through the platform of the car and bearing upon the said lever.

2. In a device of the character described, the combination with a car-body and running-gear, of a fender-frame having upturned rear ends pivotally attached to the running-gear, a network secured within said frame, stirrups depending from the bottom of the car and having inturned ends, bolts attached to the fender-frame and passing through said inturned ends, nuts arranged on said bolts to limit the upward movement of the same, a cross-bar attached to the upper ends of said bolts, springs arranged between the inturned ends of the stirrups and said cross-bar, a lever pivotally attached at one end to the bottom of the car, a link connected to said lever and said cross-bar, and a pin passing through a hole in the platform of the car and bearing on said lever.

In testimony whereof I affix my signature in the presence of two witnesses.

PHILIP TODD.

Witnesses:
H. C. EVERT,
E. E. POTTER.